United States Patent
Hasuyama et al.

(10) Patent No.: US 6,663,845 B1
(45) Date of Patent: Dec. 16, 2003

(54) METHOD AND APPARATUS FOR PRODUCING ZEOLITE

(75) Inventors: Nobuko Hasuyama, 17-15, Ohashi 1-chome, Minami-ku, Fukuoka-shi, Fukuoka (JP), 815-0033; Takashi Nitta, 2545-14, Asahigaoka-machi, Hanamigawa-ku, Chiba-shi, Chiba (JP), 262-0017; Junichi Hojo, 60-13, Miwadai 2-chome, Higashi-ku, Fukuoka-shi, Fukuoka (JP), 811-0212

(73) Assignees: Nobuko Hasuyama, Fukuoka (JP); Takashi Nitta, Chiba (JP); Junichi Hojo, Fukuoka (JP); Shintoh Ltd., Fukuoka (JP)

( * ) Notice: Subject to any disclaimer, the term of this patent is extended or adjusted under 35 U.S.C. 154(b) by 99 days.

(21) Appl. No.: 10/031,504

(22) PCT Filed: Jul. 26, 2000

(86) PCT No.: PCT/JP00/05002

§ 371 (c)(1),
(2), (4) Date: Jan. 15, 2002

(87) PCT Pub. No.: WO01/10780

PCT Pub. Date: Feb. 15, 2001

(30) Foreign Application Priority Data

Aug. 9, 1999 (JP) .......................................... 11-225320

(51) Int. Cl.[7] .......................... C01B 39/16; C01B 39/20; C01B 39/28; C01B 39/50

(52) U.S. Cl. ............... 423/700; 423/712; 423/DIG. 21; 423/DIG. 24; 423/DIG. 32

(58) Field of Search ................................ 423/700, 712, 423/DIG. 21, DIG. 24, DIG. 32

(56) References Cited

U.S. PATENT DOCUMENTS 5,908,604 A * 6/1999 Stenzel et al. ............ 422/245.1
2001/0054549 A1 * 12/2001 Park et al. .............. 204/157.43

FOREIGN PATENT DOCUMENTS

| EP | 0358827 | 3/1990 |
| JP | 64-24014 | 1/1989 |
| JP | 6-321525 | 11/1994 |
| JP | 6-321526 | 11/1994 |
| JP | 10-324518 | 12/1998 |
| WO | WO 99/41191 A * | 8/1999 |

OTHER PUBLICATIONS

Querol, X.; Alastuey, A.; Lopez–Soler, A.; Plana, F.; Andres, J. M.; Juna, R.; Ferrer, P. and Ruiz, C. R.; "A Fast Method for Recycling Fly Ash: Microwave–Assisted Zeolite Synthesis" Environ. Sci. Technol., vol. 31, 1997, pp. 2527–2533, XP002246632.

(List continued on next page.)

Primary Examiner—David Sample
(74) Attorney, Agent, or Firm—Jordan and Hamburg LLP

(57) ABSTRACT

A composition comprising an incineration ash or an aluminosilicate as a raw material is added with an aqueous alkaline solution from an alkali storage tank (3) and heated. The resultant pre-mixture is then mixed and kneaded by a kneader (4) to prepare a kneaded mixture (19) in the form of a slurry or mud. The kneaded mixture (19) is moved continuously and irradiated directly with an electromagnetic wave of 300 MHz to 30 GHz in an electromagnetic wave irradiation unit (21), to thereby convert it to zeolite. The zeolite thus formed is cleaned by means of a cleaning machine (7) and dried with a rotary steam dryer (9). This method can be employed for producing an artificial zeolite with a reduced amount of alkali used and discharged, at a lower energy expenditure, and a reduced time for production.

2 Claims, 3 Drawing Sheets

OTHER PUBLICATIONS

Cundy, C. S.; Plaisted R. J. and Zhao, J. P.: "Remarkable Synergy between Microwave Heating and the Addition of Seed Crystals in Zeolite Synthesis –a Suggestion Verified" Chem. Commun., 1998, p. 1465 XP002246633.

Datavase WPI, Section Ch, Week 199506 Derwent Publication Ltd., London, GB; Class C04, AN 1995–040969 XP002246634 & JP 06 321526 A (Nippon Steel Corp), Nov. 22, 1994 (Nov. 22, 1994) –abstract–.

* cited by examiner

METHOD AND APPARATUS FOR PRODUCING ZEOLITE

TECHNICAL FIELD

The present invention relates to a technology for producing zeolite from incineration ash or a composition containing aluminosilicate as a raw material.

BACKGROUND ART

Conventionally, fly ash generated in the course of coal burning and a composition containing aluminosilicate have been used as raw materials for producing artificial zeolite. Japanese Unexamined Patent Publication No. 6-321525 and No. 6-321526 disclose methods and apparatuses for producing zeolite from such raw materials by means of a hot aqueous alkaline solution.

Japanese Unexamined Patent Publication No. 10-324518 discloses a method of continuously producing artificial zeolite by a circulating fluidized-bed as well as a device therefor.

In the conventional methods of producing artificial zeolite, a mixture formed by mixing fly ash or a composition containing aluminosilicate with an alkali is heated by radiation heat or conduction heat. The thermal energy density has limits to increase, which often makes a heating time longer. Further, the reaction speed of forming zeolite with a hot aqueous alkaline solution is slow, thereby taking a longer time to produce artificial zeolite. In other words, heating is performed from outside of particles, and therefore a longer time is needed for heat influx into the particles and for diffusion of an alkali, resulting in a longer reaction time as a whole.

In addition, the zeolite generated by the thermal alkaline reaction forms crust over the particle surface, retarding the reaction inside the particles. Thus, the formation of zeolite is hindered, and the zeolite conversion rate is not high.

Furthermore, in the conventional methods, a large amount of sodium hydroxide which is not involved in the reaction requires a large amount of work and time in recovering and reutilizing the alkali, making it difficult to produce artificial zeolite having a high function at a low cost.

There is a further problem from a viewpoint of energy saving since the conventional methods require the steps of separating artificial zeolite from an alkaline solution, and washing and drying the zeolite, and the separating and drying steps need a large amount of energy, resulting in a high production cost.

An object of the present invention is to provide a technology which enables production of artificial zeolite by a simpler process, compared with the conventional technology, with a reduced amount of alkali used and discharged at a lower energy expenditure, and a reduced time for production.

DISCLOSURE OF INVENTION

In order to solve the above-described problems, the method for producing zeolite according to the present invention comprises adding an aqueous alkaline solution to incineration ash or a composition containing aluminosilicate to prepare a mixture in the form of slurry or mud, heating the mixture, and directly irradiating the mixture with electromagnetic waves having frequencies ranging from 300 MHz to 30 GHz, while continuously moving the mixture, to form the zeolite. By employing this process, an alkali in a minimum amount necessary for the reaction penetrates into the particle solid phase of incineration ash or the like, and the alkali instantly forms zeolite by means of the heat generated from inside the particles by the electromagnetic wave irradiation. This process, therefore, enables the production of artificial zeolite in a short time, with a reduced amount of alkali used and discharged. Further, the conventional solid-liquid separation/purification processes are not necessary, thereby simplifying the whole process.

It is noted that incineration ash or a composition containing aluminosilicate may include natural zeolite and artificial zeolite produced by other production methods which have not been converted into phillipsite. Accordingly, the present invention can be applied to improving the properties of natural or other zeolite.

Since the electromagnetic wave irradiation causes heat generation only in the mixture of incineration ash or the like, virtually without heating the surrounding devices, the atmospheric gases, etc., the heat efficiency is high and the energy expenditure can be lowered. Furthermore, the electromagnetic wave is irradiated after the mixture is heated, thereby raising the heat conversion efficiency to approximately 70%. As this preliminary heating process, the mixture is preferably heated at a temperature ranging from 80 to 150° C.

The principal component of the zeolite produced according to the present invention is phillipsite. It may also include faujasite, zeolite A, hydroxy sodalite, etc. with non-zeolite components, that is, components other than zeolites, such as unburned carbon, iron, etc.

It is noted that the incineration ash described in the present invention is incineration ash made of compositions containing aluminosilicate. The incineration ash includes coal ash, incineration ash of sludge generated in paper manufacturing, incineration ash from activated sludge produced by sewage disposal, incineration ash from city garbage, incineration ash of solidified fuel made from garbage or the like. The composition containing aluminosilicate refers to a mineral containing a salt formed by partially substituting silicate or silicon dioxide with aluminum. Such mineral is exemplified as orthoclase, anorthite, analcime, chabazite and mica.

By irradiating the electromagnetic waves having frequencies ranging from 300 MHz to 30 GHz, the dipole moments of water molecules existing in the mixture of incineration ash or a composition containing aluminosilicate and an aqueous alkaline solution vibrate vigorously (from several hundred million to several billion times per second) to give a high temperature by generating heat inside the particles of incineration ash or the like, which promotes a hot alkaline reaction instantly. Thus, the reaction to form zeolite, which took several hours to several tens of hours according to the conventional methods, can be completed in several minutes.

Since the mixture of incineration ash or a composition containing aluminosilicate and an aqueous alkaline solution is in the form of slurry or mud, the handling and transportation efficiency in the production process are improved. Further, an efficient heat generation can be realized by the electromagnetic wave irradiation. Thus, the amount of alkali can be adjusted to a minimum necessary for the reaction, resulting in great reduction of the amount of discharged waste alkali.

The reaction to form zeolite nuclei which determines the rate of overall reaction to form zeolite is accelerated by adding particles for nucleus formation in advance to incineration ash or a composition containing aluminosilicate. Thus, the reaction speed of forming zeolite is raised by three to five times, thereby producing artificial zeolite in a shorter time. As the particles for nucleus formation, zeolite particles, glass powder, etc. are suitable.

Since a mixture of incineration ash or a composition containing aluminosilicate and an aqueous alkaline solution is continuously moved during irradiation of electromagnetic waves, the control and adjustment of the irradiation conditions are easier, allowing continuous working of the overall process for producing zeolite. Accordingly, the efficiency of the process is enhanced. It is noted that, if the mixture of incineration ash or the like has edges or protrusions, the electric field tends to concentrate on the edges or protrusions, causing uneven heating. It is preferable to employ a cylindrical rotary heater or a conveyor-type heater which can move the heating surface up and down to prevent such uneven heating.

By using, as incineration ash, fly ash formed in the course of coal burning or garbage incineration, industrial wastes can be converted into useful resources. Fly ash formed in the course of coal burning refers to minute ash particles collected by a dust collector in the course of coal burning using a pulverized coal-fired boiler. The ash particles include silicon oxide, aluminum oxide, calcium oxide, etc., with an ignition loss of 5% or less and a specific gravity of 1.9 or more, having a particle size distribution passing 75% or more of the particles through a 44 $\mu$m standard sieve. Fly ash generated by garbage incineration has a composition containing silica, alumina and lime, which is similar to the fly ash generated by coal burning.

The apparatus for producing zeolite according to the present invention is an apparatus comprising: kneading means for adding an aqueous alkaline solution to incineration ash or a composition containing aluminosilicate to form a mixture and for kneading the mixture; heating means for heating the mixture kneaded by the kneading means; electromagnetic wave irradiation means for irradiating the heated mixture with electromagnetic waves to form zeolite; cleaning means for cleaning the zeolite formed by the electromagnetic wave irradiation; and drying means for drying the cleaned zeolite.

The apparatus having the above construction realizes a simpler process for producing artificial zeolite, compared with the conventional technology, with a reduced amount of alkali used and discharged, at a lower energy expenditure, and a reduced time for production.

BEST MODE FOR CARRYING OUT THE INVENTION

Figure 1:
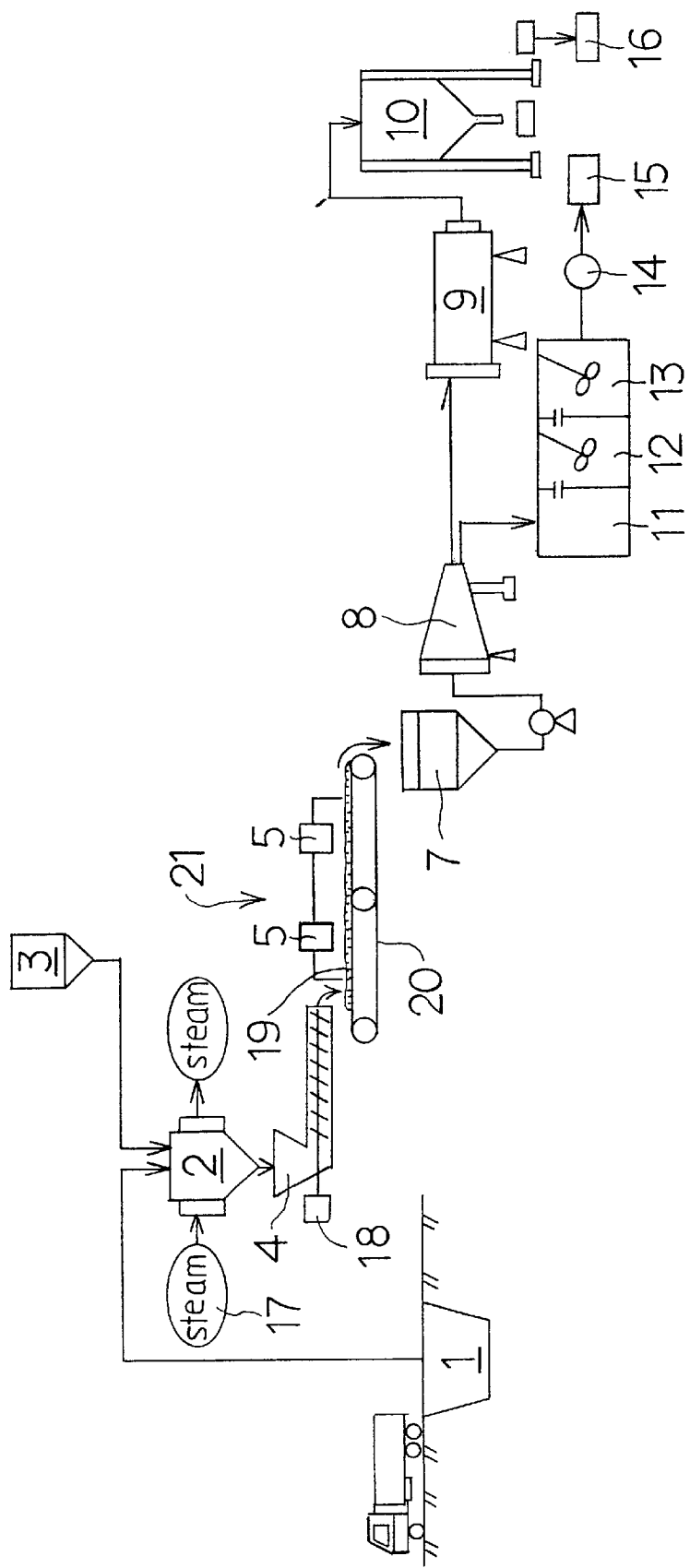
FIG. 1 is a schematic view showing a process in an apparatus for producing zeolite.

Following are explanations of an embodiment of the present invention referring to the drawings.

As shown in FIG. 1, incineration ash such as fly ash transported by a transportation vehicle or the like is stored in a raw material receiving vessel 1 and then sent to a preliminary heater 2 by a conveyer pump. Then an aqueous alkali at an alkali concentration of 1 to 30 percent by weight is added from an alkali storage tank 3. The mixture is heated to 80 to 150° C., and then sent into a kneader 4 where the mixture is kneaded. The preliminary heater 2 is heated with steam 17, and the kneader 4 is operated by a motor 18.

A kneaded mixture 19 in the form of slurry formed in the kneader 4 is placed on a conveyor 20 and conveyed to an electromagnetic wave irradiation unit 21. While the mixture is being conveyed, the mixture is irradiated with electromagnetic waves having a frequency of 2,450 MHz from electromagnetic wave irradiators 5 located over the conveyor 20 for 1 to 15 minutes. In this way, the reaction for zeolite generation progresses rapidly in the kneaded mixture 19, forming zeolite. It is noted that the electromagnetic wave irradiation conditions can be adjusted in frequencies ranging from 300 MHz to 30 GHz (wavelength: 1 cm–1 m) and in the irradiation time ranging from 1 to 30 minutes.

After completion of the electromagnetic wave irradiation, the kneaded mixture 19 is cured and then sent to a cleaning machine 7 where alkali attached to the formed zeolite is washed off. Then, the cleaned zeolite is dehydrated by a centrifuge 8 and mildly dried with steam heating in a rotary steam dryer 9 to produce artificial zeolite. The artificial zeolite is put into a product receiving vessel 10, weighed to a specific weight value, packed, and shipped out as a product 16.

The aqueous alkali generated from the centrifuge 8 is sent to an alkali receiving tank 11, treated in a primary waste water treatment apparatus 12 and a secondary waste water treatment apparatus 13, passes through a monitoring apparatus 14, and then discharged as waste water 15.

Figure 2:
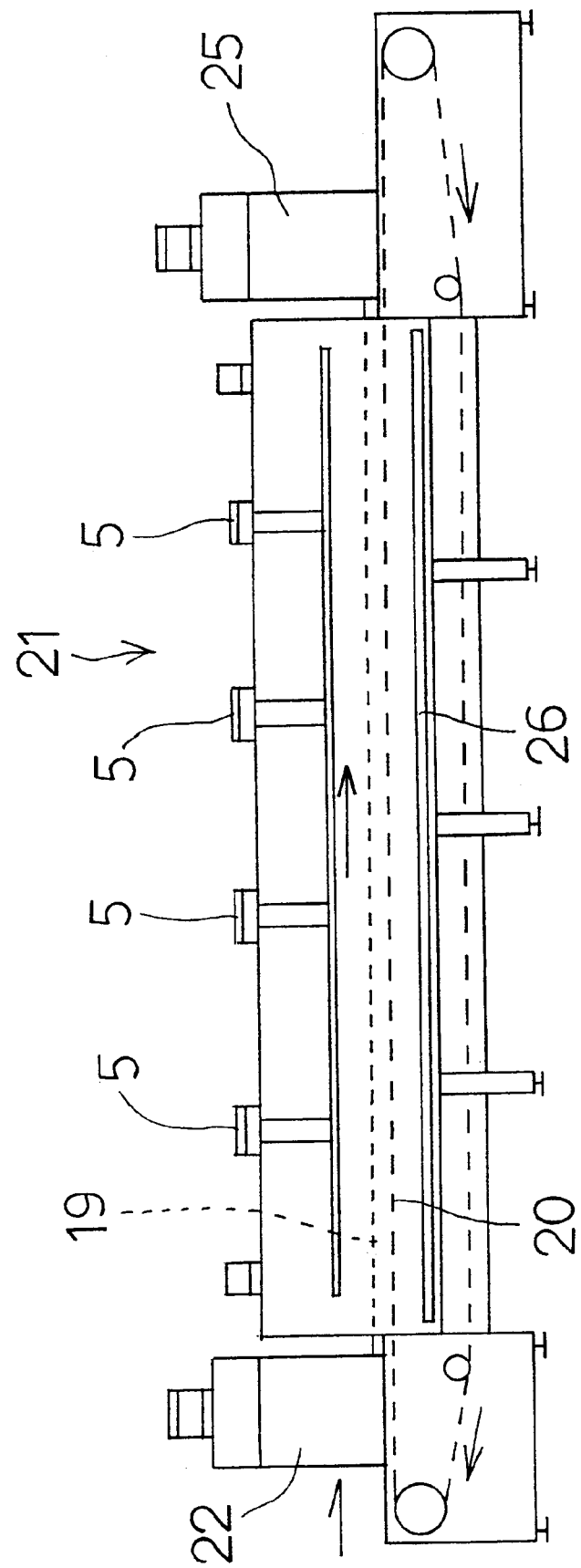
FIG. 2 is a side view showing an electromagnetic wave irradiation unit in the apparatus for producing zeolite shown in FIG. 1.

In the electromagnetic wave irradiation unit 21, as shown in FIG. 2, a feed adjuster 22 for the kneaded mixture 19 is located in the proximity of the start of the conveyor 20, and a plurality of electromagnetic wave irradiators 5 are disposed over the conveyor 20. A curing floor 25 for the formed zeolite is located in the proximity of the end of the conveyor 20, and a microwave prevention guide 26 is disposed inside the conveyor 20.

Figure 3:
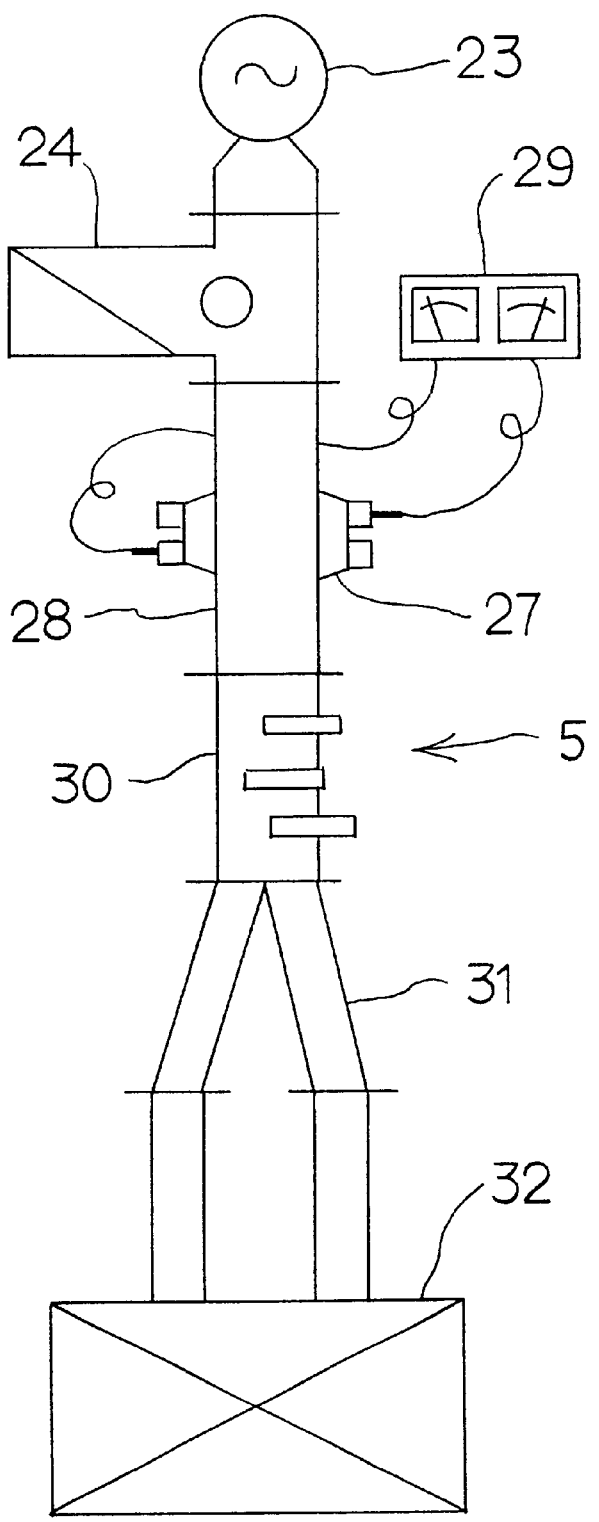
FIG. 3 is a schematic view showing an electromagnetic wave generator for the electromagnetic wave irradiation unit shown in FIG. 2.

As shown in FIG. 3, adjacent to the microwave transmitter 23, disposed are an isolator 24 which prevents leak of the microwaves generated, a directional coupler 27 for transmitting the generated microwaves to a microwave irradiation section 32, a power monitor 28, an indicator 29, a matching device 30, a fixed distributor 31, and the microwave irradiation section 32 for irradiating a materiel to be heated with microwaves, etc.

In the kneaded mixture 19 sent through the feed adjuster 22 and placed on the conveyor 20, reaction for zeolite generation rapidly progresses by irradiation with microwaves generated by the microwave transmitter 23 while the kneaded mixture 19 is being conveyed and, therefore, zeolite is formed in a short time until the mixture reaches the end of the conveyer 20. The zeolite thus formed is cured in the curing floor 25, and then sent, as described above, to the cleaning machine 7 in which a specific treatment is performed.

Accordingly, in the course of adding an aqueous alkaline solution to incineration ash, kneading the resultant mixture, heating the kneaded mixture 19 thus formed, and irradiating the kneaded mixture 19 with electromagnetic waves to form zeolite, a minimum amount of alkali necessary for the reaction penetrates into the particle solid phase of incineration ash, and the alkali instantly forms zeolite by means of the heat generated from inside the particles by the electromagnetic wave irradiation. This process, therefore, enables production of artificial zeolite in a short time, with a reduced amount of alkali used and discharged. Further, the conventional solid-liquid separation/purification processes are unnecessary, thereby simplifying the whole process.

Additionally, since the electromagnetic wave irradiation causes heat generation only in the kneaded mixture 19, virtually without heating the surrounding devices, the atmospheric gases, etc., the heat efficiency is high and the energy consumption can be lessened. Furthermore, the electromagnetic wave is irradiated after the kneaded mixture 19 is preliminarily heated to approximately 80 to 150° C., thereby raising the heat conversion efficiency to approximately 70%.

The principal component of the zeolite formed by the embodiment of the present invention is phillipsite. It may also include faujasite, zeolite A, hydroxy sodalite, etc. with non-zeolite components, that is, components other than zeolite, such as unburned carbon, iron, etc.

By irradiating the mixture with electromagnetic waves having a frequency of 2,450 MHz, the dipole moments of water molecules existing in the kneaded mixture 19 vibrate vigorously (from several hundred million to several billion times per second) to give a high temperature by generating heat inside the particles of incineration ash or the like, which promotes a hot alkaline reaction instantly. Thus, the reaction to form zeolite, which took from several hours to several tens of hours according to the conventional methods, can be completed in several minutes.

Since the kneaded mixture 19 is in the form of slurry, the handling and transportation efficiency in the production process are improved. Further, an efficient heat generation can be realized by the electromagnetic wave irradiation. Thus, the amount of alkali can be adjusted to a minimum necessary for the reaction, resulting in great reduction of the amount of discharged waste alkali.

It is noted that the present invention is not limited to the above-described embodiment, and the components, concentrations and amounts of the aqueous alkali to be added can be varied according to the type, components, properties, etc. of a raw material such as incineration ash. The water amount and the properties of the kneaded mixture, and the frequencies, the irradiation time, etc. of the electromagnetic waves to be used in the irradiation can also be varied as appropriate.

EXAMPLE 1

A mixture of coal ash and incineration ash of sludge generated in paper manufacturing at a ratio of 1:2–5 was treated under the above-described conditions using the apparatus for producing zeolite shown in FIG. 1. The conversion rate to Ca-type artificial zeolite was approximately 90% when the ratio was in the range of 1:2–3. It was possible to produce the Ca-type artificial zeolite with high efficiency by the electromagnetic wave irradiation for the duration of 3 to 5 minutes by accelerating the formation of zeolite nuclei through adding 10 to 20 percent by weight of glass powder to the incineration ash of sludge generated in paper manufacturing.

EXAMPLE 2

Incineration ash from city garbage (RDF incineration ash) was treated using the apparatus for producing zeolite shown in FIG. 1. It was possible to convert the incineration ash to zeolite in one half to one third of the electromagnetic wave irradiation time compared with the case of treating coal ash.

EXAMPLE 3

When treating a raw material having a different Si/Al ratio, such as incineration ash, etc., the components of the artificial zeolite formed can be controlled by adjusting the ratio of Ca, Na, etc. which are the components of the aqueous alkali to be added from the alkali storage tank 3, or by controlling the electromagnetic wave irradiation time.

Next, the method of manufacturing artificial zeolite according to the present embodiment was compared with the method of manufacturing artificial zeolite by means of the conventional hot aqueous alkaline solution. In the method of the present embodiment, it was possible to reduce the pollution load to 5 kg per one ton of artificial zeolite from the conventional 100 kg and to reduce the energy consumption (heavy oil-converted) to 0.05 kl per one ton of artificial zeolite from 0.5 kl which was necessary in the conventional method. Furthermore, it was possible to reduce the production cost per one ton of artificial zeolite to about 1/3.5 to 1/5 of the conventional cost.

Industrial Applicability

The present invention can be utilized as an efficient technology for producing zeolite using incineration ash or a composition containing aluminosilicate, including natural zeolite, as a raw material.

What is claimed is:

1. A method of producing zeolite comprising:
   adding an aqueous alkaline solution to incineration ash or a composition containing aluminosilicate to form a mixture in the form of slurry or mud;
   heating said mixture; and
   directly irradiating said mixture with electromagnetic waves having frequencies ranging from 300 MHz to 30 GHz, while continuously moving said mixture, thereby forming the zeolite.

2. The method of producing zeolite according to claim 1, wherein said composition is natural zeolite or zeolite which has not been converted into phillipsite.

* * * * *